Aug. 27, 1929. H. LODGE Re. 17,418

COMBINED OUTSIDE LIGHT, MAIL BOX, AND HOUSE NUMBER

Original Filed Aug. 28, 1925

Inventor
HARRY LODGE
By Sam Edelson
Attorney

Reissued Aug. 27, 1929. Re. 17,418

UNITED STATES PATENT OFFICE.

HARRY LODGE, OF PHILADELPHIA, PENNSYLVANIA.

COMBINED OUTSIDE LIGHT, MAIL BOX, AND HOUSE NUMBER.

Original No. 1,616,269, dated February 1, 1927, Serial No. 52,986, filed August 28, 1925. Application for reissue filed October 17, 1927. Serial No. 226,781.

My invention relates to a new and useful improvement in a combined outside light, mail box and house number, and has for its object to so construct such a device as to provide an illuminated mail box. Also to provide for the illumination of the porch where the box is mounted as well as to bring into prominent relief the house number.

With these ends in view, this invention consists in the details of construction and combination of elements hereinafter set forth and then specifically designated by the claims.

Figure 1:
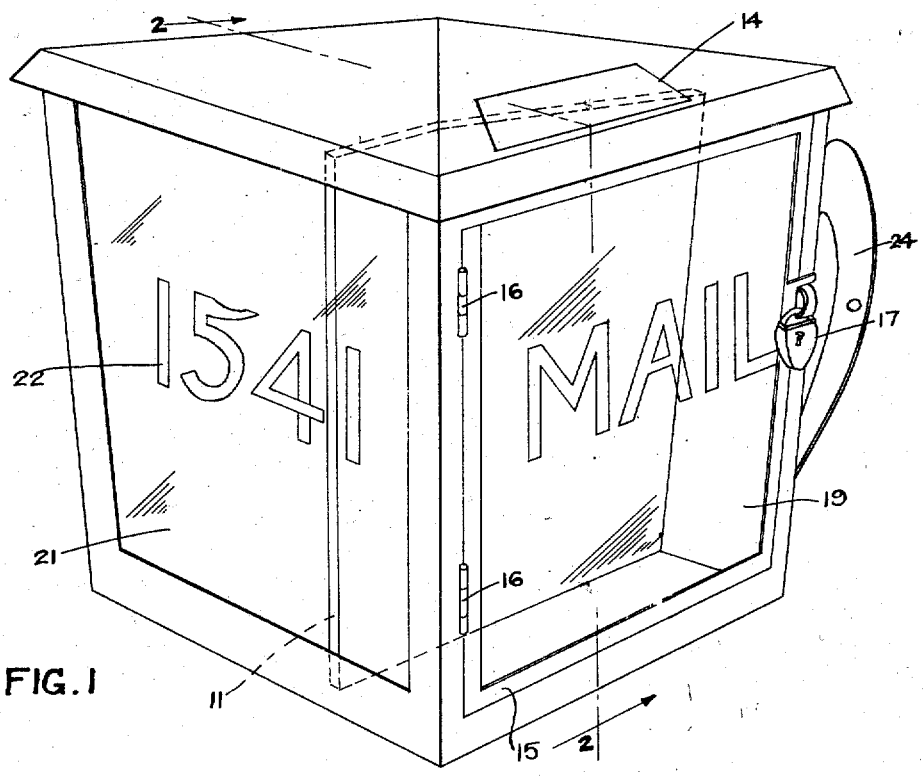

In order that those skilled in the art to which this invention appertains, may understand how to make and use the same, I will describe its construction in detail, referring by numerals to the accompanying drawings forming a part of this application in which:

Figure 1 is a perspective of an illuminated letter box and a housing for containing an electric lamp.

Figure 2:
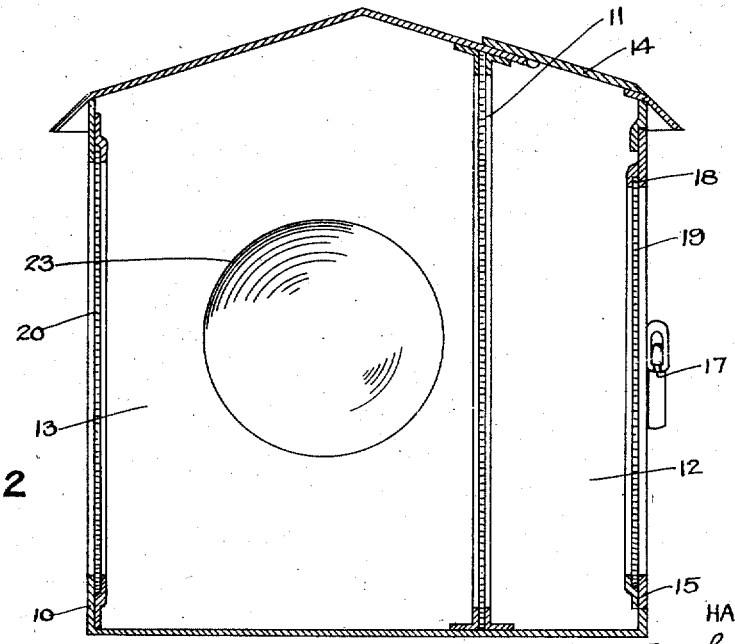

Figure 2 is a center vertical section of Figure 1. In carrying out my invention as herein embodied, 10 represents a casing having a partition 11 therein, which divides the interior thereof into the compartments 12 and 13. Preferably, this partition is made of glass or other transparent material, but it is to be understood that it may be made of opaque or translucent material without effecting a departure from the spirit or principles of the invention. The compartment 12, is proportioned to serve as a letter box having a hinged top 14, which may be raised for the insertion of mail matter, and when closed will shed the water, and this mail box compartment also is provided with a door 15, which is hinged as indicated at 16; means being provided for locking the door against all unauthorized access to the contents of the mail box as indicated at 17.

The inner face of the door 15 is provided with a flanged frame 18, in which is set a transparent glass 19 in order that the interior of the box may be readily seen from the outside.

The walls of the compartment 13 have secured therein the glasses 20 and 21, and upon the glass 21 is painted or otherwise applied the number 22, which represents the number of the house where the box is installed.

23 represents a lamp, preferably an electric lamp, which is mounted inside of the compartment 13. When this lamp 23 is lit, the light therefrom will illuminate the porch or space immediately surrounding the box and will likewise bring into bold relief the house number 22, as will be readily understood. Further, should the partition 11 be formed in the preferable manner, that is, of glass or other transparent material, the light from the lamp will shine through this transparent partition to thereby illuminate the interior of the letter box compartment 12 and so enable ready observation to be had of the contents of the letter box through the glass 19.

Any suitable fastening, such as indicated at 24, may be carried by the box for its securement to the space of the house or other object where the box is to be located.

Of course, I do not wish to be limited to the exact details of construction as herein shown as this may be varied within the limits of the appended claims without departing from the spirit of my invention.

Having thus fully described my invention, what I claim as new and useful is:—

1. A device of the character described comprising two compartments separated by a transparent partition, one of said compartments adapted to be used as a letter box, the other compartment adapted to be used as a lamp housing, panes of glass in those walls of the compartments disposed in parallelism with the transparent partition, a pane of glass in one wall of the compartments disposed at right angles to the partition, said pane of glass having a house number thereon, and a lamp in one of the compartments.

2. In a combined mail box, outside light and house number displaying device, a casing, panes of glass set in the walls of said casing so as to permit the free passage of light, a transparent partition dividing the interior of the said casing into two compartments of different widths, a lamp mounted in the larger of said compartments, a door carrying a glass forming a closure for the smaller of said compartments, a hinged lid covering an opening in the top of the smaller compartment, and means for mounting the casing from the wall of the house.

3. In a combined mail box, outside light and house number displaying device, a main casing, a transversely extending partition therein dividing said casing into two compartments constituting, respectively, a lamp housing and a letter box, a pane of glass in that wall of the casing paralleling said partition and constituting the outer wall of said lamp housing, a pane of glass of a size substantially equal to and disposed in that wall of the casing arranged adjacent and projecting to either side of one edge of said partition, and a door hinged to said casing and forming a closure for that compartment which constitutes the letter box.

In testimony whereof, I have hereunto affixed my signature.

HARRY LODGE.